United States Patent
Tomonaga (10) Patent No.: US 6,697,268 B2
(45) Date of Patent: Feb. 24, 2004

(54) DC-DC POWER SUPPLY (75) Inventor: Shinzo Tomonaga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/275,249

(22) PCT Filed: Apr. 6, 2001

(86) PCT No.: PCT/JP01/02999
§ 371 (c)(1),
(2), (4) Date: Mar. 7, 2003

(87) PCT Pub. No.: WO02/084836
PCT Pub. Date: Oct. 24, 2002

(65) Prior Publication Data
US 2003/0165068 A1 Sep. 4, 2003

(51) Int. Cl.[7] ............................. H02M 5/45; G05F 1/577
(52) U.S. Cl. ............................. 363/37; 363/16; 323/267; 307/32

(58) Field of Search ............................. 363/37, 49, 16, 363/65, 67, 71; 323/267; 307/82, 31, 32

(56) References Cited

U.S. PATENT DOCUMENTS

| 4,062,057 A | * | 12/1977 | Perkins et al. ................ 363/71 |
| 5,576,941 A | * | 11/1996 | Nguyen et al. ........... 363/21.07 |
| 6,493,243 B1 | * | 12/2002 | Real ............................. 363/17 |

FOREIGN PATENT DOCUMENTS

| JP | 63-138884 | * | 9/1988 |
| JP | 11-4506 | * | 1/1999 |

* cited by examiner

Primary Examiner—Jessica Han
(74) Attorney, Agent, or Firm—Sughrue Mion, PLLC (57) ABSTRACT

A DC/DC power source device of this invention can regulate an imbalance voltage applied to a smoothing circuit and reduce a loss as well as a packaging area. The device also can achieve miniaturization of the circuit.

2 Claims, 6 Drawing Sheets

DC-DC POWER SUPPLY

TECHNICAL FIELD

The present invention relates to a DC-DC power source device for obtaining a prescribed DC power from DC power source.

BACKGROUND ART

Figure 6:
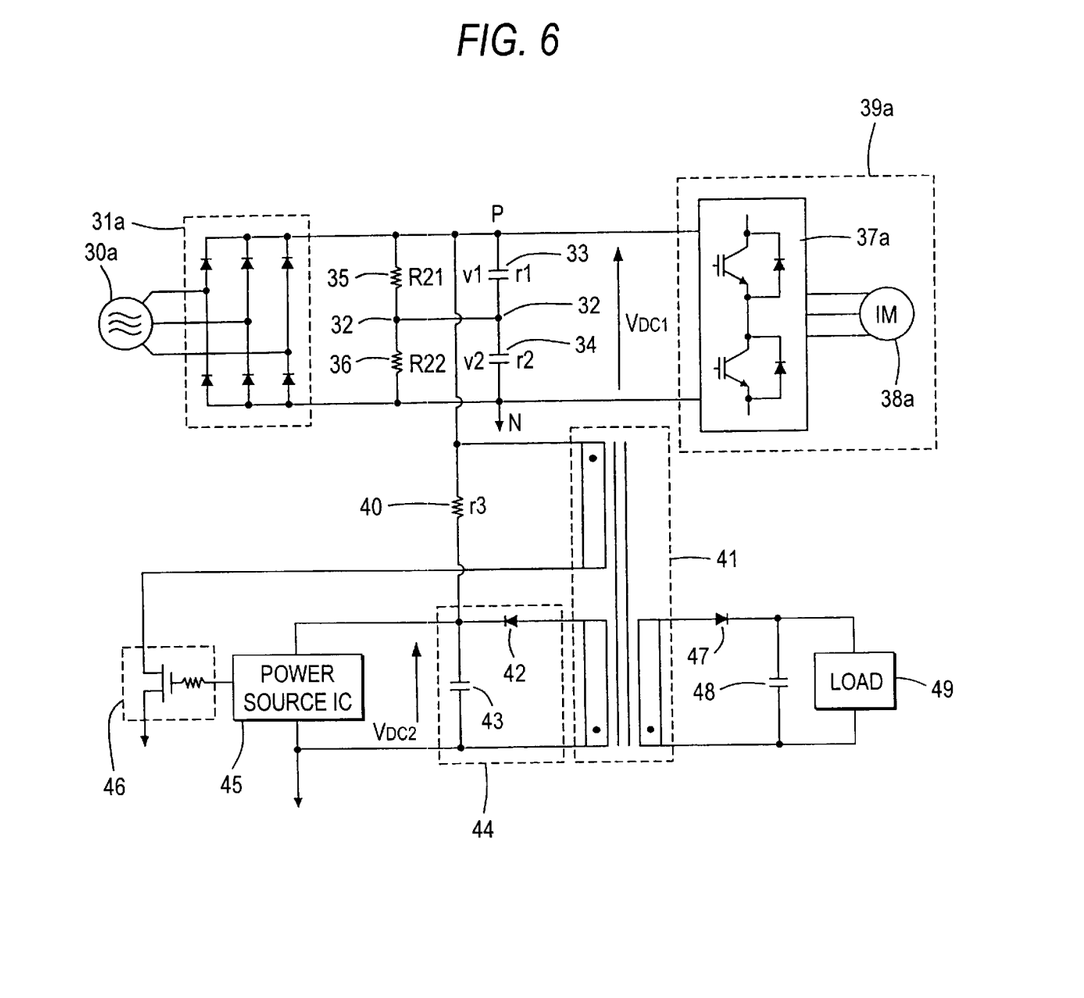
FIG. 6 is a schematic view of an AC variable speed device having a built-in DC-DC power source device according to the embodiment 6.

FIG. 6 shows the configuration of an AC variable speed device with a conventional built-in DC-DC power source device. In FIG. 6, reference numeral 30a designates a three-phase AC power source; 31a, a converter unit which converts AC power to DC power; 32, a neutral point between electrode terminals P and N of a DC main circuit power source; 33, a P side smoothing circuit connected between the anode P and the neutral point 32 of the DC main circuit power source; and 34, an N side smoothing circuit connected between the cathode N and the neutral point 32 of the DC main circuit power source. Reference numeral 35 denotes a P side balancing circuit connected between the anode terminal P and the neutral point 32 of the DC main circuit power source; 36, an N side balancing circuit connected between the cathode terminal N and the neutral point 32 of the DC main circuit power source.

In addition, reference numeral 37a denotes an inverter unit that inverts DC power of the DC main circuit power source to AC power with a variable frequency and a variable voltage; 38a, an induction motor driven at a variable speed; 39a, a load circuit comprising the inverter unit 37a and the induction motor 38a and operates as a load of the DC main circuit power source.

Further, reference numeral 40 indicates a starting circuit connected between the anode terminal P of the DC main circuit power source and a switching control circuit 45; 41, a high-frequency transformer having two secondary windings; 42, a rectifier circuit diodes for generating a DC output current from the high-frequency transformer 41; and 43, a rectifier circuit capacitor.

Reference numeral 44 designates a DC rectifier circuit comprising the rectifier circuit diodes 42 and the rectifier circuit capacitor 43; 45, a switch control circuit; 46, a switching circuit; 47, a secondary rectifier circuit diode; 48, a secondary rectifier circuit capacitor; 49, a secondary load such as a control unit (not shown) for controlling the inverter unit 37a.

The DC-DC power source device contained in the conventional AC variable speed device is comprised of the starting circuit 40, the high frequency transformer 41, the DC rectifier circuit 44, the switch control circuit 45, the switching circuit 46, the secondary rectifier circuit diode 47 and the secondary rectifier circuit capacitor 48.

The operation of the conventional AC variable speed device is set forth below. AC power of the three phase AC power source 30a is converted to DC power by the converter unit 31a and the converted DC power is then filtered by a smoothing circuit (the P side smoothing circuit 33 and the N side smoothing circuit 34) to work as the DC main circuit power source. The inverter unit 37a inverts DC power of the DC main circuit power source to AC power with variable frequency and variable voltage, thereby driving the induction motor 38a at variable speeds.

The conventional AC variable speed device contains the DC-DC power source device as DC power source of control unit (not shown) for controlling the inverter unit 37a, supplying a prescribed DC power source to the control unit by utilizing the DC main circuit power source. Here, the P side balancing circuit 35 and the N side balancing circuit 36 are used to regulate a voltage sharing ratio between the P side smoothing circuit 33 and the N side smoothing circuit 34 to lower the voltage applied to these smoothing circuits 33 and 34 below their withstand voltage.

It is assumed that these balancing circuits (P side balancing circuit 35 and N side balancing circuit 36) do not exist. Defining that an internal impedance of the P side smoothing circuit 33 is r1, an internal impedance of the N side smoothing circuit 34 is r2, a voltage applied to the P side smoothing circuit 33 is v1, a voltage applied to the N side smoothing circuit 34 is v2, and a DC main circuit voltage smoothed is V DC 1, the voltage v1 applied to the P side smoothing circuit 33 and the voltage v2 applied to the N side smoothing circuit 34 are expressed by the following formulas (1) and (2), respectively:

$$v1=(r1/(r1+r2))\times V_{DC1} \quad (1)$$

$$v2=(r2/(r1+r2))\times V_{DC1} \quad (2)$$

When the capacitance and withstand voltage V of the P side smoothing circuit 33 are identical with those of the N side smoothing circuit 34, and when the internal impedance r1 of the P side smoothing circuit 33 are 3 times larger than the internal impedance r2 of the N side smoothing circuit 34, the formulas (1) and (2) are expressed by following formulas (3) and (4), respectively:

$$v1=(\tfrac{3}{4})\times V_{DC1} \quad (3)$$

$$v2=(\tfrac{1}{4})\times V_{DC1} \quad (4)$$

Therefore, the withstand voltage V of the P side smoothing circuit 33 must be at least ¾ times larger than that of the DC main circuit voltage $V_{DC1}$. The balancing circuits (P side balancing circuit 35 and N side balancing circuit 36) are disposed in order to adjust the difference in voltage applied to the smoothing circuits, caused by the difference between the internal impedance r1 of the P side smoothing circuit 33 and the internal impedance r2 of the N side smoothing circuit 34.

Given now that, the impedance of the P side balancing circuit 35 is R21, the impedance of the N side balancing circuit 36 is R22, the combined resistance of the impedance R21 of the P side balancing circuit 35 and the internal impedance r1 of the P side smoothing circuit 33 is Rc21, and the combined resistance of the impedance R22 of the N side balancing circuit 36 and the internal impedance r2 of the N side smoothing circuit 34 is Rc22, the voltage v1 applied to the P side smoothing circuit. 33 and the voltage v2 applied to the N side smoothing circuit 34 are expressed by the following formulas (5) and (6), respectively:

$$v1=(Rc21/(Rc21+Rc22))\times V_{DC1} \quad (5)$$

$$v2=(Rc22/(Rc21+Rc22))\times V_{DC1} \quad (6)$$

When the impedance R21 of the P side balancing circuit 35 is assumed as R21<<r1, and when the impedance R22 of the N side balancing circuit 36 is assumed as R22<<r2, the combined resistances Rc21 and Rc22 are expressed as Rc21≈R21 and Rc22≈R22, respectively.
Assuming herein that R21=R22, the formulas (5) and (6) can be expressed by the following formulas (7) and (8), respectively.

$$v1=V_{DC1}/2 \quad (7)$$

$$v2=V_{DC1}/2 \quad (8)$$

The voltage v1 applied to the P side smoothing circuit 33 and the voltage v2 applied to the N side smoothing circuit 34 are ½ times larger than DC main circuit voltage $V_{DC1}$, thereby making it possible to adjust the imbalance voltage applied to each smoothing circuit.

Therefore, the withstand voltages v of the P side smoothing circuit 33 and the N side smoothing circuit 34 are lowered to equal to or less than ½ of the DC main circuit voltage $V_{DC1}$.

An operation of the DC-DC power source device contained in the conventional AC variable speed device will be described. Application of AC power source 30a to the AC variable speed device causes the DC main circuit power constituted by the converter unit 31a and the smoothing circuit (P side smoothing circuit 33 and N1 side smoothing circuit 34) to charge the rectifier circuit capacitor 43 through the starting circuit 40. Besides, the rectifier circuit capacitor 43 supplies the charged DC power to the switch control circuit 45, and as a result, the circuit 45 outputs a high frequency oscillating signal to the switching circuit 46. The switching circuit 46 oscillates at high frequency and supplies high frequency power to the high frequency transformer 41. The high frequency transformer 41 supplies DC power to the DC rectifier circuit 44 comprised of the rectifier circuit diode 42 and the rectifier circuit capacitor 43, and supplies DC power to the secondary rectifier circuit diode 47, the secondary rectifier circuit capacitor 48 and the secondary load 49.

Besides, after the power source is activated, operating power of the switch control circuit 45 is supplied from the direct current rectifier circuit 44 and the starting circuit 40.

In above conventional DC-DC converter, there is a problem that circuit loss increases due to the fact that a current from the DC main circuit power; source always flows through the starting circuit 40. The loss P in the starting circuit 40 can be expressed by the following formula (9), where the DC main circuit voltage is $V_{DC1}$, the impedance of the starting circuit 40 is r3, and voltage across both terminals of the rectifier circuit capacitor 43 is $V_{DC2}$.

$$P=(V_{DC1}-V_{DC2})^2/r3 \qquad (9)$$

In the case where the input AC power source equal to or more than 420V, this loss increases further.

In order to secure distance sufficient for insulation, it is necessary to have an enough mounting area, presenting obstacles to miniaturization of the circuit.

It is an object of the invention to solve aforementioned problems.

Another object of the invention is to reduce the circuit loss in the DC-DC power source device.

It is a further object of the invention to miniaturize the DC main circuit power source device.

DISCLOSURE OF THE INVENTION

A DC-DC power source device of this invention is comprised of a secondary rectifier circuit constituted by a secondary rectifier diode and a secondary rectifier capacitor, a DC rectifier circuit formed by a DC rectifier diode and a DC rectifier capacitor, a switch control circuit for outputting a high frequency oscillating signal according to a DC power supplied from the DC rectifier circuit, a switching circuit for oscillating at a high frequency according to the high frequency oscillating signal outputted from the switching control circuit to generate high frequency power, a high frequency transformer having two secondary windings and supplying a DC power to the secondary rectifier circuit and the DC rectifier circuit according to high frequency power supplied from the switching circuit, wherein one end of the primary winding of the high frequency transformer is connected to an anode of a DC main circuit power source, the other end of the primary winding being connected to the switching circuit, wherein the anode of DC rectifier circuit supplying a DC power to the switching control circuit is connected to an anode of the DC main circuit power source through a balancing circuit including at least two balancing resistors which connected in series each other, wherein the balancing circuit is connected in parallel with a smoothing circuit which is connected to the anode of the DC main circuit power at one end and which comprises at least two capacitors with same capacitance being connected in series between the anode and the cathode of the DC main circuit power, and wherein a combined impedance of the balancing resistor connected to the cathode of the DC main circuit power and the switching control circuit is equal to that of the other balancing resistor.

In addition to the feature as recited above, the DC-DC power source device of this invention is further comprising a detour prevention circuit interposed between the DC rectifier capacitor and the balancing resistor connected to the cathode of the DC main circuit power source, a voltage applied to the switch control circuit being kept equal to or less than a predetermined value when the DC main circuit voltage becomes high.

THE BEST MODE FOR CARRYING OUT THE INVENTION

Embodiment 1

Figure 1:
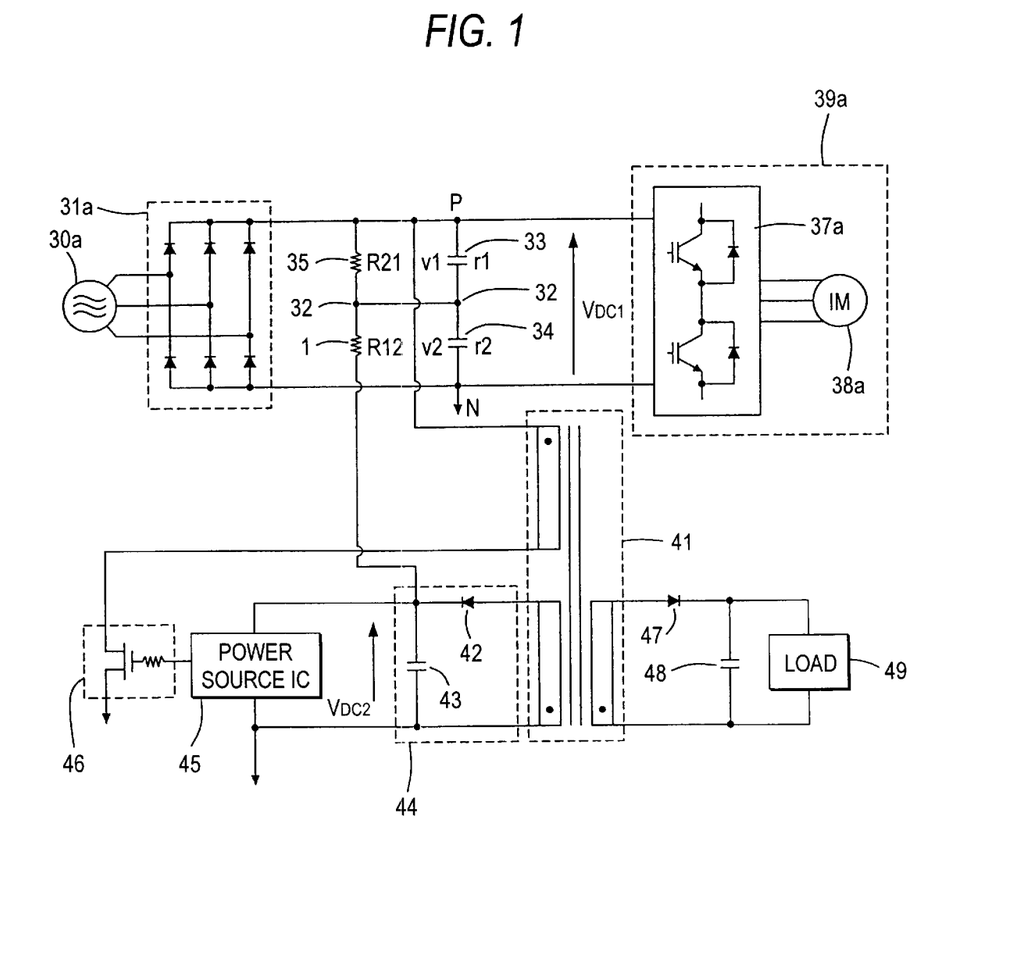
FIG. 1 is a schematic view of an AC variable speed device having a built-in DC-DC power source device according to the embodiment 1.

FIG. 1 shows the configuration of an AC variable speed device having a built-in DC-DC power source device according to the embodiment 1 of the present invention.

In the drawing, reference numerals 30a, 31a, 32 to 35, 37a to 39a, and 41 to 49 represent the same constituent members as those shown in FIG. 6, and the explanation of such members will be omitted. Reference numeral 1 indicates an N side balancing circuit, and reference numeral R12 shows an impedance of the N side balancing circuit 1.

It will be assumed hereby that (the impedance R21 of the P side balancing circuit 35)<<(the internal impedance r1 of the P side smoothing circuit 33), and (the impedance R12 of the N side balancing circuit 1)<<(the internal impedance r2 of the N side smoothing circuit 34).

In the conventional example mentioned above, the rectifier circuit capacitor 43 is charged through the starting circuit 40 from the anode terminal P of the DC main circuit power source and the charged DC power is supplied to the switch control circuit 45 from the capacitor 43.

In the embodiment 1, however, the negative terminal of the N side balancing circuit 1 is connected to the rectifier circuit capacitor 43 to supply DC power so charged to the switching control circuit 45.

Further, in the conventional art mentioned above, the P side balancing circuit 35 of the impedance R21 and the N side balancing circuit 36 of the impedance R22 are connected in series between the anode terminal P and the cathode terminal N of the DC main circuit power source. (R21=R22)

In the embodiment 1, the P side balancing circuit 35 of the impedance R21 and the N side balancing circuit 1 of the impedance R12 are connected in series. The P side balancing circuit 35 is connected to the anode terminal P of the DC main circuit power source. The N side balancing circuit 1 is however, connected to the cathode terminal N of the DC main circuit power source through the rectifier circuit capacitor 43. Power from three-phase AC power source 30a is once converted to DC power and then inverted to AC power with the variable frequency and the variable voltage to drive the induction motor 38a at variable speeds in the same manner as that in the conventional art mentioned above, and the detail explanation thereof will be therefore omitted.

Next, the operation of the DC-DC power source device built in the AC variable speed device in the embodiment 1 will be described. When the three-phase AC power source 30a is applied to the AC variable speed device, the DC main circuit power source is activated by the converter unit 31a and the smoothing circuits (P side smoothing circuit 33 and N side smoothing circuit 34). When the DC main circuit voltage is applied to the P side smoothing circuit 33 and the N side smoothing circuit 34, the balancing circuit comprising the P side balancing circuit 35 and the N side balancing circuit 1 supplies the charging current to the rectifier circuit capacitor 43, Then, the rectifier circuit capacitor 43 supplies DC power so charged to the switch control circuit 45. The switch control circuit 45 outputs a high-frequency oscillating signal to the switching circuit 46. The switching circuit 46 oscillates at the high frequency to supply high frequency power to the high frequency transformer 41. DC power is supplied from the high frequency transformer 41 to the DC rectifier circuit 44 comprising the rectifier circuit diode 42 and the rectifier capacitor 43, and also to the secondary rectifier circuit diode 47, the secondary rectifier capacitor 48 and the secondary load 49.

After power starting, operating power current of the switch control circuit 45 is supplied from the DC rectifier circuit 44 and the balancing circuit comprising the P side balancing circuit 35 and the N side balancing circuit 1. Starting power of the switch control circuit 45 is supplied through the impedance resistance R12 of the N side balancing circuit 1. Defining that the voltage applied to the P side balancing circuit 33 is v1, the voltage applied to the N side smoothing circuit 34 is v2, and the power source voltage of the switch control circuit 45 is $V_{DC2}$, the impedance resistance R12 of the N side smoothing circuit 1 is expressed by the formula (10)

$$R12=(v2-V_{DC2})/(v1/R21) \tag{10}$$

In the embodiment 1, a voltage sharing ratio of the P side smoothing circuit 33 and the N side smoothing circuit 34 is regulated by the impedance R21 of the P side balancing circuit 35 and the combined impedance R3 of the N side balancing circuit 1 and the switch control circuit 45 connected in parallel with the N side smoothing circuit 34. The voltage applied to the P side smoothing circuit 33 and the N side smoothing circuit 34 is kept below the withstand voltage of the smoothing circuits. Here, in order to adjust the imbalance voltage applied to each smoothing circuit, it is recommended that the voltage applied to the P side smoothing circuit 33 becomes equal to the voltage applied to the N side smoothing circuit 34 (v1=v2=$V_{DC1}$/2).

Therefore, the impedance resistance R12 of the N side balancing circuit 1 is calculated in the following formula (11).

$$R12=(V_{DC1}-2 \times V_{DC2})/(V_{DC1}/R21) \tag{11}$$

As described above, in the embodiment 1, the switch control circuit 45 is connected between the N side balancing circuit 1 having the impedance resistance R12 calculated by the formula (11) and the N electrode of the smoothed DC main circuit power source so that starting power of the switch control circuit 45 can be supplied through the impedance resistance R12 of the N side balancing circuit 1 and so that the imbalance voltage applied to each smoothing circuit can be regulated.

Embodiment 2

Figure 2:
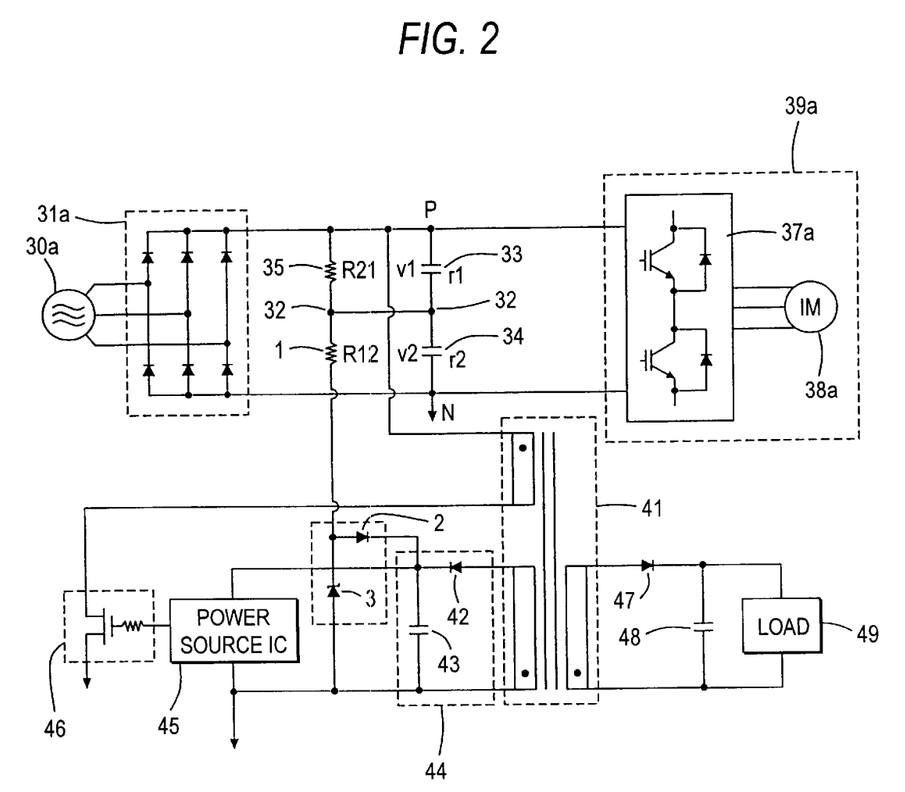
FIG. 2 is a schematic view of an AC variable speed device having a built-in DC-DC power source device according to the embodiment 2.

FIG. 2 shows the constitution of an AC variable speed device including a DC-DC power source device according to the embodiment 2. In the drawing, reference numeral 30a, 31a, 32 to 35, 37a, 38a, 39a and 41 to 49 denote the same constituent members as those shown in FIG. 6, and their explanation will be omitted. Numeral 1 indicates an N side balancing circuit; 2, a detour prevention circuit; and 3, a constant voltage circuit. The circuit of the preferred embodiment 2 is different from that of the embodiment 1 in that the detour prevention circuit 2 and the constant voltage circuit 3 are added, thereby intending to realize the DC-DC power source device coping with fluctuations of a power source and a load.

Next, the operation of the DC-DC power source device built in the AC variable speed device according to the embodiment 2 will be explained. The switching control circuit 45 is connected between the N side balancing circuit 1 having the impedance resistance R12 given by the formula (11) and the N electrode terminal of the smoothed DC main circuit power source.

Starting power of the switch control circuit 45 is supplied through the impedance resistance R12 of the N side balancing circuit 1. The high frequency power from the switch control circuit 45 and the switching circuit 46 is supplied to the high-frequency transformer 41 and thereby supplying the DC power to the DC rectifier circuit 44 comprising the rectifier circuit diode 42 and the rectifier circuit capacitor 43, and to the secondary rectifier circuit diode 47, the secondary rectifier circuit capacitor 48 and the secondary load 49. The above operations are the same as those of Embodiment 1. The impedance R21 of the P side balancing circuit 35, the impedance R12 of the N side balancing circuit 1 and the switching control circuit 45 are generally selected so that the current supplied from the N side balancing circuit 1 becomes lower than the consumed current of the switch control circuit 45 of the DC rectifier circuit 44.

When, however, when the DC main circuit power source fluctuates and when the DC main circuit voltage becomes high, the current supplied from the N side balancing circuit 1 to the DC-DC power source device becomes higher. When the current supplied from the N side balancing circuit 1 to the DC-DC power source device becomes higher than the consumed current of the switch control circuit 45 of the DC rectifier circuit 44, the voltage charged in the rectifier circuit capacitor 43 rises and exceeds the withstand voltage of the switching control circuit 45, thereby causing the switch control circuit 45 to be damaged.

In the embodiment 2, the detour prevention circuit 2 is added between the N side balancing circuit 1 and the rectifier circuit capacitor 43, so that the voltage applied to the switch control circuit 45 can be kept below the required voltage even when the DC main circuit voltage becomes high. The detour prevention circuit 2 can prevent detouring of flow of current when the DC rectifier circuit voltage becomes higher than the voltage of the constant voltage circuit 3.

Embodiment 3

Figure 3:
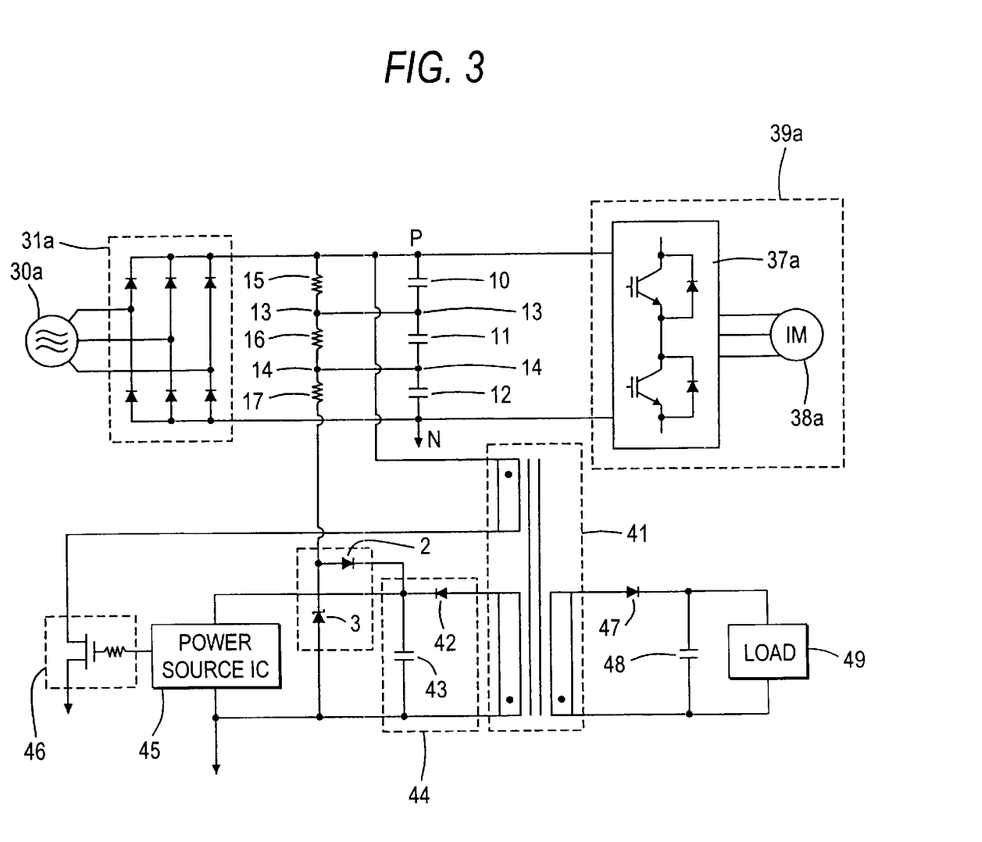
FIG. 3 is a schematic view of an AC variable speed device having a built-in DC-DC power source device according to the embodiment 3.

FIG. 3 shows the constitution of the AC variable speed device including the DC-DC power source device according to the preferred embodiment 3.

In the drawing, reference numerals 30a, 31a, 37a to 39a and 41 to 49 denote the same constituent members as those shown in FIG. 6, and their explanation will be omitted. Reference numeral 2 denotes a detour prevention circuit; 3, a constant voltage circuit; 10, 11 and 12, smoothing circuits; 13, a junction between the smoothing circuit 10 and the smoothing circuit 11; 14, a junction between the smoothing circuit 11 and the smoothing circuit 12; and 15, 16 and 17, balance circuits. The junction 13 is a junction between the balancing circuit 15 and the balancing circuit 16, and the junction 14 is a junction between the balancing circuit 16 and the balancing circuit 17. The embodiments 1 and 2 shows an example where the smoothing circuit comprising two series connection of the P side smoothing circuit and the N side smoothing circuit is connected between the anode terminal and the cathode terminal of the DC main circuit power source.

In the case of the high voltage circuit having a high DC main circuit voltage, however, smoothing circuits are connected in series in multiple stages and thereby the withstand voltage of each smoothing circuit can be lowered. In the embodiment 3, a smoothing circuit comprising three smoothing circuits 10, 11 and 12 connected in series is connected between the anode and the cathode terminals of the DC main circuit power source.

In this case, the impedance of the balancing circuit 15 is made equal to the impedance of the balancing circuit 16, while the impedance of the balancing circuit 17 is a value such that the impedance of the balancing circuit 15 (or the balancing circuit 16) is equal to the combined impedance of the balancing circuit 17 and the switch control circuit 45, thereby the imbalance voltage applied to each smoothing circuit can be regulated.

Embodiment 4

Figure 4:
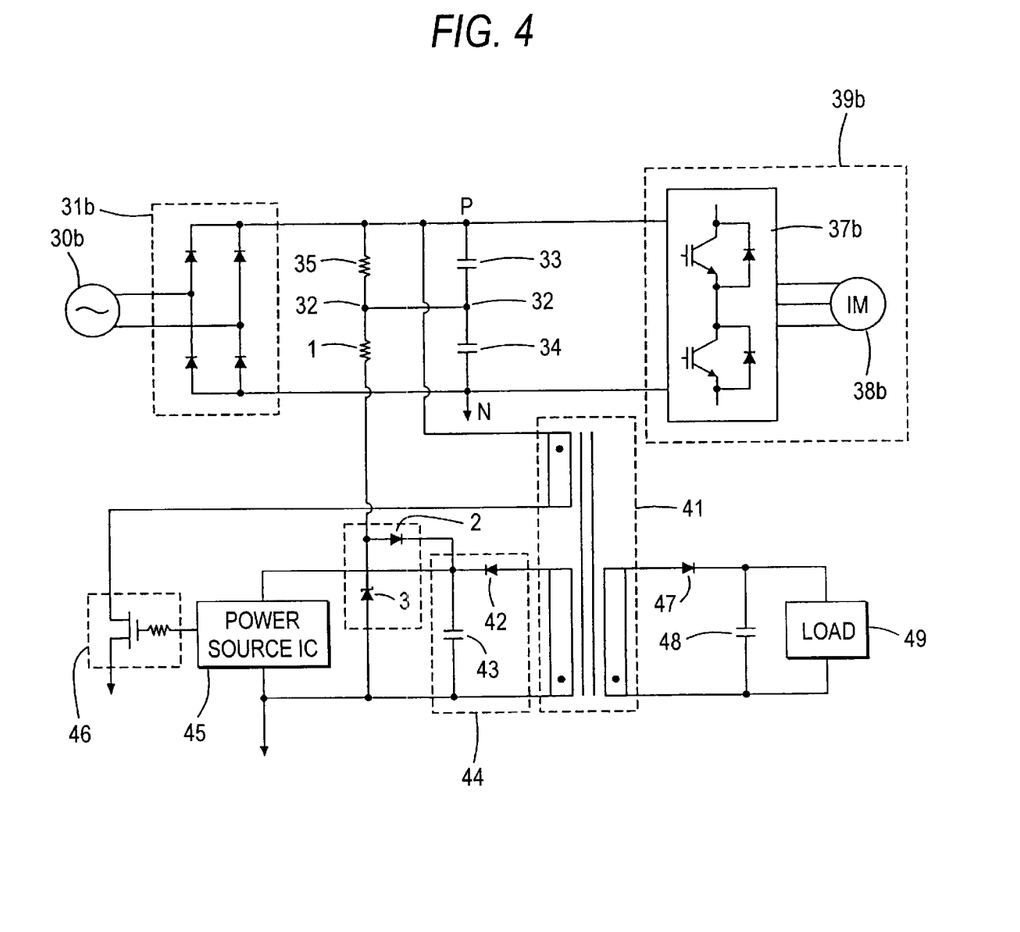
FIG. 4 is a schematic view of an AC variable speed device having a built-in DC-DC power source device according to the embodiment 3 and shows an example in which a single phase AC power source 30b is used.

FIG. 4 shows the constitution of an AC variable speed device having a built-in DC-DC power source device according to the embodiment 4 of the present invention, and represents an example where a single-phase AC power source 30b is used. In the drawing, reference numerals 1 to 3, 32 to 35 and 41 to 49 denote the same constituent members as those in FIG. 2, and their explanation will be omitted. Reference numeral 30b designates a single-phase AC power source; 31b, a converter unit for converting AC power to DC power. Reference numeral 37b indicates an inverter unit for inverting DC power of the DC main circuit power source to AC power having a variable frequency and a variable voltage; 38b, an induction motor driven at variable speeds; and 39b, a load circuit as a load of the DC main circuit power source. The load circuit comprises the inverter unit 37b and the induction motor 38b.

Embodiment 5

Figure 5:
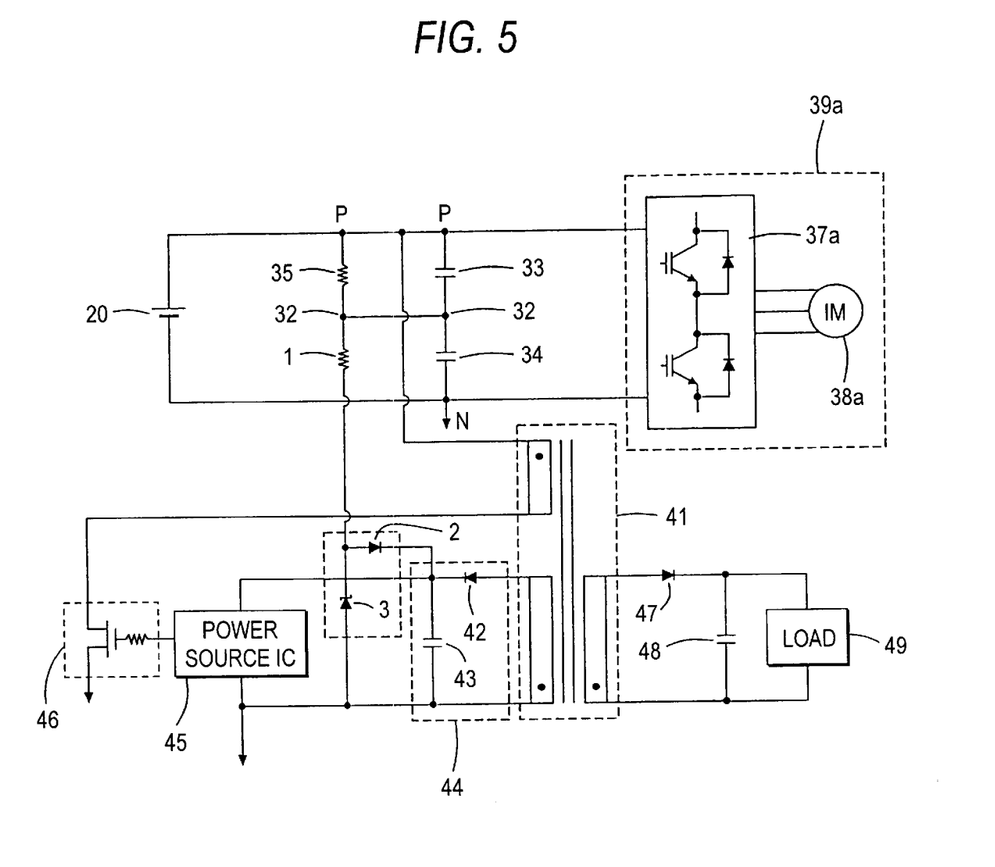
FIG. 5 is a schematic view of an AC variable speed device having a built-in DC-DC power source device according to the embodiment 5.

FIG. 5 shows the constitution of an AC variable speed device having a built-in DC-DC power source device according to the embodiment 5 of the present invention. In the drawing, reference numerals 1 to 3, 31a, 37a to 39a and 41 to 49 denote the same constituent members as those shown in FIG. 2 and their explanation will be omitted. Reference numeral 20 denotes a battery.

Although the embodiments 1 to 3 as well as the conventional example show examples where the three-phase AC power source 30a is rectified by the converter unit 31a to generate the DC main circuit power source and although the embodiment 4 shows an example where the single-phase AC power source 30b is rectified by the converter unit 31b to generate the DC main circuit power source. In the embodiment 5, the battery 20 is used as the DC main circuit power source.

Industrial Applicability

As described above, the DC-DC power source device according to the present invention regulate the imbalance voltage applied to each smoothing circuit, reduce the loss as well as the packaging area, and miniaturize the DC main circuit power source device. Therefore, the DC-DC power source device can be suitably used for a high voltage circuit.

What is claimed is:

1. A DC-DC power source comprising:

a secondary rectifier circuit constituted by a secondary rectifier diode and a secondary rectifier capacitor;

a DC rectifier circuit formed by a DC rectifier diode and a DC rectifier capacitor;

a switch control circuit for outputting a high frequency oscillating signal according to a DC power supplied from said DC rectifier circuit;

a switching circuit for oscillating at a high frequency according to the high frequency oscillating signal outputted from said switching control circuit to generate a high frequency power; and a high frequency transformer having two secondary windings and supplying a DC power to said secondary rectifier circuit and DC rectifier circuit according to high frequency power supplied from said switching circuit, wherein one end of a primary winding of said high frequency transformer is connected to an anode of a DC main circuit power source, the other end of the primary winding being connected to said switching circuit, wherein the anode of DC rectifier circuit supplying a DC power to said switching control circuit is connected to an anode of said DC main circuit power source through a balancing circuit including at least two balancing resistors which connected in series each other, wherein said balancing circuit is connected in parallel with a smoothing circuit which is connected to the anode of said DC main circuit power at one end, and which comprises at least two capacitors with same capacitance being connected in series between the anode and the cathode of said DC main circuit power, and wherein a combined impedance of one of said balancing resistors connected to the cathode of said DC main circuit power and said switching control circuit is equal to the other balancing resistor.

2. A DC-DC power source according to claim 1, further comprising a detour prevention circuit interposed between said DC rectifier capacitor and the balancing resistor connected to said cathode of said DC main circuit power source, a voltage applied to the switch control circuit being kept equal to or less than a predetermined value when said DC main circuit voltage becomes high.

* * * * *